(12) United States Patent
Seidlitz et al.

(10) Patent No.: US 12,298,729 B2
(45) Date of Patent: May 13, 2025

(54) SYSTEMS AND METHODS FOR GATING LOCAL CONTROL SIGNALS

(71) Applicant: Rockwell Automation Technologies, Inc., Mayfield Heights, OH (US)

(72) Inventors: Steven Seidlitz, Brookfield, WI (US); Joseph Izzo, Cedarburg, WI (US); James Grosskreuz, New Berlin, WI (US); Kevin E. Colloton, Tomahawk, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 559 days.

(21) Appl. No.: 17/688,525

(22) Filed: Mar. 7, 2022

(65) Prior Publication Data

US 2023/0280711 A1  Sep. 7, 2023

(51) Int. Cl.
*G05B 19/042*  (2006.01)

(52) U.S. Cl.
CPC ............ *G05B 19/0425* (2013.01); *G05B 2219/24024* (2013.01)

(58) Field of Classification Search
CPC ............ G05B 19/0425; G05B 2219/24024
See application file for complete search history.

(56) References Cited

U.S. PATENT DOCUMENTS

| | | | |
|---|---|---|---|
| 7,774,074 B2 * | 8/2010 | Davlin | G05B 19/0421 710/110 |
| 8,892,218 B2 | 11/2014 | Shah et al. | |
| 9,244,111 B2 * | 1/2016 | Clarridge | G01R 31/52 |
| 9,923,783 B1 * | 3/2018 | Manchineni | H04L 12/12 |
| 10,715,388 B2 | 7/2020 | Fildebrandt et al. | |
| 11,182,206 B2 | 11/2021 | Jung et al. | |
| 11,474,873 B2 | 10/2022 | Biernat et al. | |
| 11,513,877 B2 | 11/2022 | Biernat et al. | |
| 2006/0224811 A1 * | 10/2006 | Sichner | G05B 19/0428 710/306 |
| 2018/0024537 A1 | 1/2018 | Chauvet et al. | |
| 2018/0054469 A1 | 2/2018 | Simoncelli | |

(Continued)

FOREIGN PATENT DOCUMENTS

| KR | 20200027783 A | 3/2020 |
|---|---|---|
| WO | 2020184362 A1 | 9/2020 |

OTHER PUBLICATIONS

Liu, Y. et al., "A Data-Centric Internet of Things Framework Based on Azure Cloud," IEEE Access, vol. 7, Mar. 27, 2019, 20 pages.

(Continued)

*Primary Examiner* — Michael A Keller
*Assistant Examiner* — Thao D Duong
(74) *Attorney, Agent, or Firm* — Fletcher Yoder, P.C.

(57) ABSTRACT

A circuit may include one or more first ports that may receive one or more input signals from a first device, such that the one or more first ports may couple to a control system. The control system may generate one or more output signals based on the one or more input signals. The circuit may also include one or more second ports that may couple to a second device, such that the one or more second ports may couple to the one or more first ports via a direct connection. The control system may also couple the one or more output signals to the one or more second ports.

20 Claims, 4 Drawing Sheets

(56) References Cited

U.S. PATENT DOCUMENTS

| | | | |
|---|---|---|---|
| 2019/0377604 A1 | 12/2019 | Cybulski | |
| 2020/0136906 A1 | 4/2020 | Bernat et al. | |
| 2020/0249928 A1 | 8/2020 | Zeng et al. | |
| 2020/0278864 A1* | 9/2020 | Ross | G06F 3/0683 |
| 2020/0278892 A1 | 9/2020 | Nainar et al. | |
| 2020/0301399 A1* | 9/2020 | Vazach | G05B 19/054 |
| 2020/0311617 A1 | 10/2020 | Swan et al. | |
| 2021/0089354 A1 | 3/2021 | Nixon et al. | |
| 2021/0141158 A1* | 5/2021 | Porter | G02B 6/262 |
| 2021/0200814 A1 | 7/2021 | Tal et al. | |
| 2021/0218617 A1 | 7/2021 | Palavalli et al. | |
| 2021/0382727 A1 | 12/2021 | Vigil et al. | |
| 2022/0027217 A1 | 1/2022 | Thoemmes et al. | |
| 2022/0091572 A1 | 3/2022 | Biernat et al. | |
| 2022/0128171 A1* | 4/2022 | Brama | F16K 37/0083 |

OTHER PUBLICATIONS

Extended European Search Report for European Patent Application No. 21179775.8, dated Nov. 25, 2021, 9 pages.

Partial European Search Report for European Patent Application No. 21180068.5, dated Dec. 8, 2021, 17 pages.

Marshall, "Industry 4.0: The PLC evolves from Controller to Cloud Interface," Feb. 9, 2018, https://www.rs-online.com/designspark/evolution-of-the-industrial-picfrom-controller-to-cloud-interface , retrieved on Nov. 29, 2021, pp. 1-6.

European Search Report for European Patent Application No. 21180068.5, dated Mar. 28, 2022,19 Pages.

Anonymous, "Pull an Image from a Private Registry", Kubernetes, retrieved on Mar. 18, 2022, 5 Pages, https://web.archive.org/web/20171003051312/https://kubernetes.io/docs/tasks/configure-pod-container/pull-image-private-registry/.

European Search Report for European Patent Application No. 21180279.8, dated Apr. 19, 2022,12 Pages.

D. Elliott, C. Otero, M. Ridley and X. Merino, "A Cloud-Agnostic Container Orchestrator for Improving Interoperability," 2018 IEEE 11th International Conference on Cloud Computing (CLOUD), 2018, pp. 958-961, doi: 10.1109/CLOUD.2018.00145. (Year: 2018).

A. Khan, "Key Characteristics of a Container Orchestration Platform to Enable a Modern Application," in IEEE Cloud Computing, vol. 4, No. 5, pp. 42-48, Sep./Oct. 2017, doi: 10.1109/MCC.2017.4250933. (Year: 2017).

* cited by examiner

SYSTEMS AND METHODS FOR GATING LOCAL CONTROL SIGNALS

BACKGROUND

The present disclosure relates generally to safety systems in an industrial automation system. More specifically, the disclosure is related to reducing safety reaction time of one or more devices in an industrial automation system performing safety functions.

In an industrial automation system, a local control system may be communicatively and physically coupled to one or more components (e.g., devices) of the industrial automation system. The local control system may include a safety controller to determine and/or execute safety operations related to the one or more components. When a fault or alarm condition is detected by one or more of the components of the industrial automation system, the component(s) may transmit a safety signal to the safety controller of the local control system to notify the safety controller of the fault. The safety controller may process the safety signal and may modify operations of certain devices downstream to the component(s) in view of the safety signal. With this in mind, there may be a delay in transmitting the notification of safety signal from the one or more components to the safety controller, processing the safety signal by the safety controller, or both, thereby delaying the time in which the operations of the industrial automation system may be modified. As such, improved systems for reducing the delay in which an industrial automation system may react to faults and safety signals is desired.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, these statements are to be read in this light, and not as admissions of prior art.

SUMMARY

In a first embodiment, a circuit may include one or more first ports that may receive one or more input signals from a first device, such that the one or more first ports may couple to a control system. The control system may generate one or more output signals based on the one or more input signals. The circuit may also include one or more second ports that may couple to a second device, such that the one or more second ports may couple to the one or more first ports via a direct connection. The control system may also couple the one or more output signals to the one or more second ports.

In yet another embodiment, a method may include receiving, via a circuit, one or more input signals at one or more first ports. The method may further include directly routing, via the circuit, the one or more input signals to one or more second ports and simultaneously routing, via the circuit, the one or more input signals to a control system while directly routing the one or more inputs to the one or more second ports. The control system may then generate one or more output signals based on the one or more input signals and send the one or more output signals to the one or more second ports.

In a further embodiment, a system may include a device that may generate one or more signals based on one or more input signals. The system may also include an Input/Output (I/O) module that may couple to the device. The I/O module may include circuitry that may have one or more first ports that may couple to the device. The one or more first ports may receive the one or more input signals. The circuitry may also include one or more second ports that may couple to the one or more first ports via a direct connection. The device may also send the one or more output signals to the one or more second ports.

DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
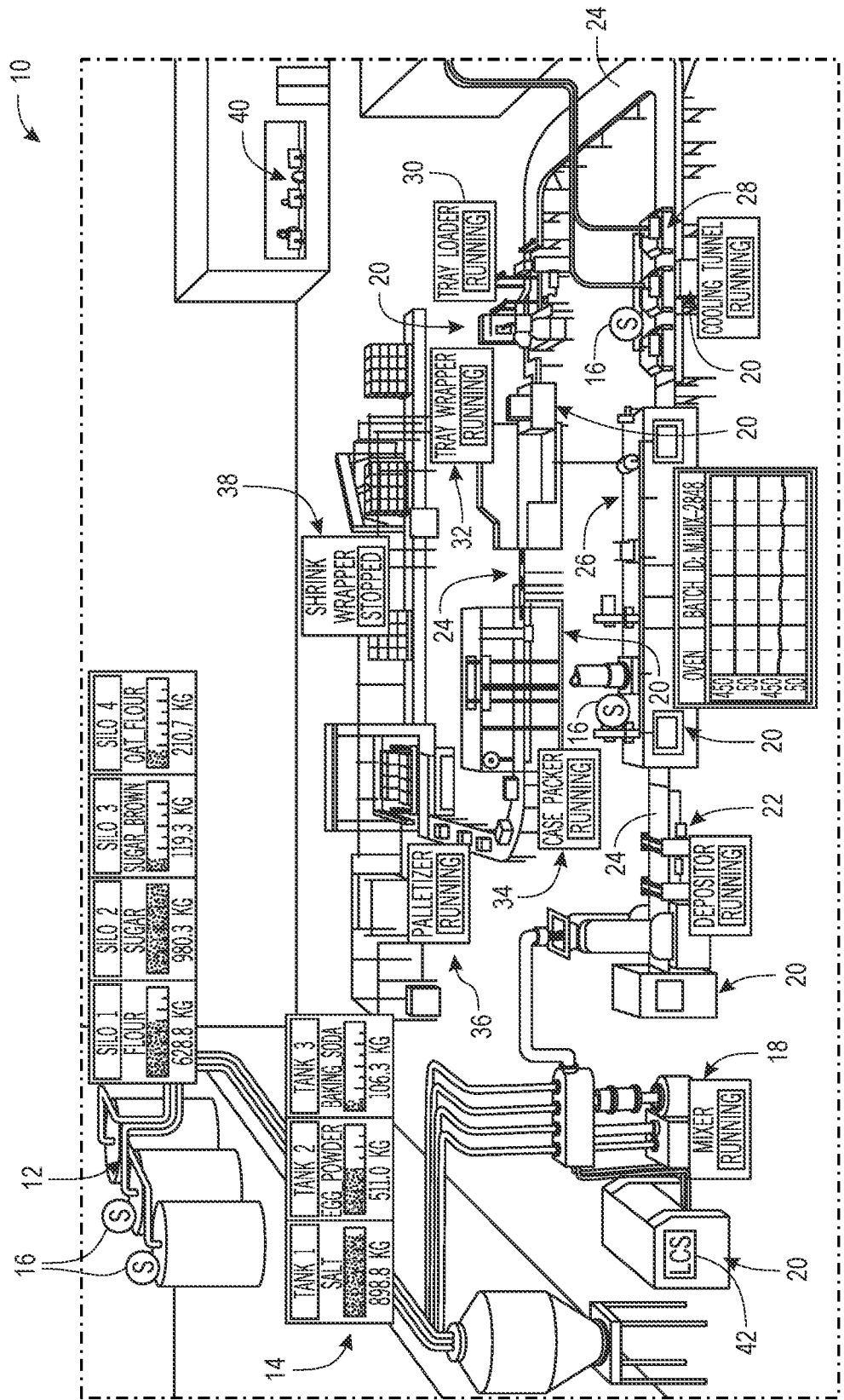
FIG. 1 illustrates an example industrial automation system, in accordance with embodiments presented herein.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiment of the present disclosure, the articles "a," "an," "the," and "said" are intended to mean that there are one or more of these elements. The terms "comprising." "including." and "having" are intended to be inclusive and mean that there may be additional elements other than the listed elements.

As described above, transmission of a safety signal in an industrial automation system may be delayed in view of network latency, communication delays, and the like. With this in mind, a safety loop circuit may transmit the safety signal to the local control system and to other devices in the industrial automation system to expedite the reaction time of the respective devices. For instance, the safety loop circuit may include one or more devices, input/output (I/O) modules coupled to the one or more devices, and a local control system. The devices of the safety loop circuit may be coupled to the local control system via a path that may transmit a safety signal from the devices. The path may be characterized as having a safety distance and may correspond to an expected amount of time to initiate a safety operation within the local control system after a respective device sends a safety signal. By way of example, after safety sensor is triggered in a first device, a signal corresponding to the triggered safety sensor may be sent to an I/O module that may be communicatively coupled to the local control system of the industrial automation system. The I/O module may forward the signal to the local control system, which may include an asynchronous safety controller that receives and processes the signal.

In response to receiving the signal from the I/O module, the safety controller may transmit a control signal (e.g., representative of one or more actions in response to the triggered safety sensor) to certain devices to modify certain operations of the industrial automation system. In some cases, the control signal may be sent to one device, which may then transmit the control signal to a second device that is connected and/or associated with the first device. The safety distance (i.e., time, delay) between the local control system and the second device via the first device may be above some threshold, and the delay may limit the abilities of the second device from performing operations to effectively protect the industrial automation system from undesirable operations. As such, it may be desirable to reduce the safety distance between the devices of the industrial automation system.

Keeping this in mind, the embodiments described herein may include a safety loop circuit that may provide a direct path between input ports and output ports of an I/O module communicatively coupled to the local control system or safety controller. In this way, the safety signal received by the I/O module may be transmitted to the safety controller and one or more output ports of the I/O module. In this way, the I/O module may bypass the safety controller and provide direct communication of the safety signal received from one or more devices communicatively coupled to the I/O module via output ports. In some cases, the direct path may include one or more logic gates in the I/O module or the output card that may receive the safety signals from the input ports and may perform logical operations based on the safety signals received from the one or more devices. Based on the safety signal and/or the outputs of the logic gates, a second device coupled to the output ports of the I/O module may perform a subsequent operation based on the received signals. Additional details regarding implementing the safety loop circuit with embodiments described herein is provided below with reference to FIGS. 1-4.

By way of introduction, FIG. 1 illustrates an example industrial automation system 10 employed by a food manufacturer in which the present embodiments described herein may be implemented. It should be noted that although the example industrial automation system 10 of FIG. 1 is directed at a food manufacturer, the present embodiments described herein may be employed within any suitable industry, such as automotive, mining, hydrocarbon production, manufacturing, and the like. That is, the following brief description of the example industrial automation system 10 employed by the food manufacturer is provided herein to help facilitate a more comprehensive understanding of how the embodiments described herein may be applied to industrial devices to significantly improve the operations of the respective industrial automation system based on the current configuration of the equipment in the industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals and preservatives. In some embodiments, sensors 16 may be positioned within or around the silos 12, the tanks 14, or other suitable locations within the example industrial automation system 10 to measure certain properties, such as temperature, mass, volume, pressure, humidity, and the like.

The raw materials be provided to a mixer 18, which may mix the raw materials together according to a specified ratio. The mixer 18 and other machines in the example industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, sensor, actuator, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the example industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may be used to provide power to the machinery used to perform certain tasks, provide protection to the machinery from electrical surges, prevent injuries from occurring with human operators in the example industrial automation system 10, monitor the operations of the respective device, communicate data regarding the respective device to a supervisory control system 40, and the like. In some embodiments, each industrial automation device 20 or a group of industrial automation devices 20 may be controlled using a local control system 42. The local control system 42 may include receive data regarding the operation of the respective industrial automation device 20, other industrial automation devices 20, user inputs, and other suitable inputs to control the operations of the respective industrial automation device(s) 20.

Figure 2:
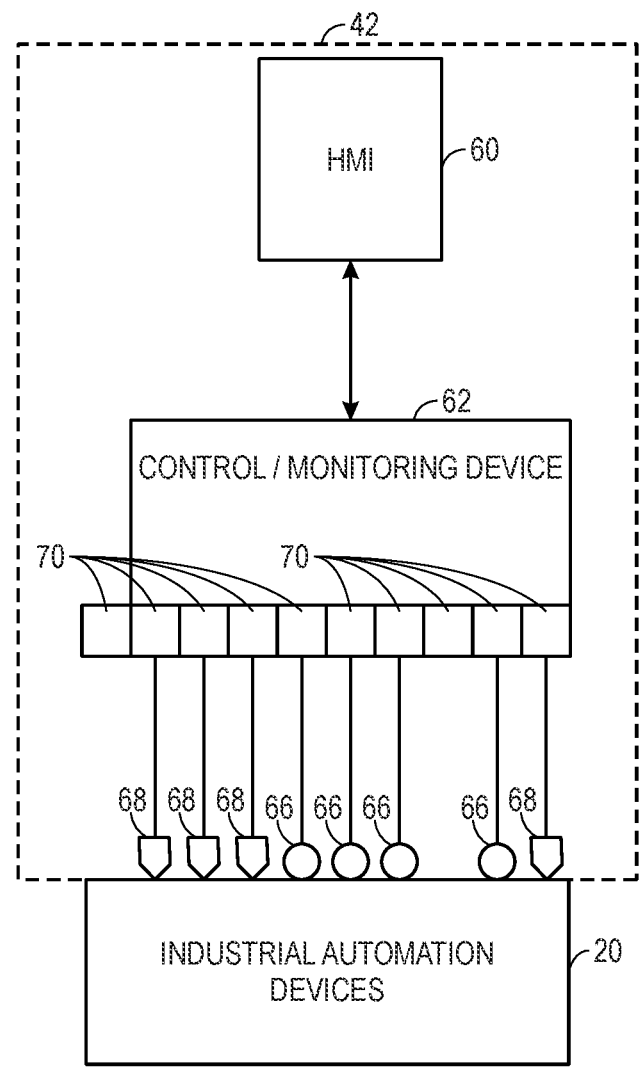
FIG. 2 is a diagrammatical representation of the exemplary control and monitoring system, in accordance with embodiments presented herein.

The local control system 42 may have access to configuration data associated with the connected industrial automation devices 20. That is, the local control system 42 may include memory or a storage component that stores information concerning the configuration of each industrial automation device 20 connected to it. In some embodiments, the information or configuration data may be populated or input by an operator at the time the respective industrial automation device 20 is installed. Additionally, the local control system 42 may query the connected industrial automation device 20 to retrieve configuration data, such as model number, serial number, firmware revision, assembly profile, device parameters, and the like. In some embodiments, the supervisory control system 40 may collect configuration data from multiple local control systems 40 and store the information in a suitable memory or storage component FIG. 2 is a diagrammatical representation of the exemplary local control system 42, in accordance with embodiments presented herein. In FIG. 2, the local control system 42 is illustrated as including a human machine interface (HMI) 60 and a control and monitoring device 62 adapted to interface with devices that may monitor and control various types of industrial automation devices 20. It should be noted that the connections between the components of the local control system 42 may include physical connections (e.g., a wire) or connections over a network. That is, it should be noted that such an interface in accordance with embodiments of the present techniques may be facilitated by the use of certain network strategies. Indeed, an industry standard network may be employed, such as DeviceNet, to enable data transfer. Such networks permit the exchange of data in accordance with a predefined protocol, and may provide power for operation of networked elements. Although not depicted in FIG. 1, the local control system 42 may also include controllers, input/output (I/O) modules, motor control centers, operator interfaces, contactors, starters, drives, relays, network switches (e.g., Ethernet switches, modular-managed, fixed-managed, service-router, industrial, unmanaged, etc.), and the like.

The industrial automation devices 20 may take many forms and include devices for accomplishing many different and varied purposes. For example, the industrial automation devices 20 may include machinery used to perform various operations in a compressor station, an oil refinery, a batch operation for making food items, a mechanized assembly line, and so forth. Accordingly, the industrial automation devices 20 may comprise a variety of operational components, such as electric motors, valves, actuators, temperature elements, pressure sensors, or a myriad of machinery or devices used for manufacturing, processing, material handling and other applications.

Additionally, the industrial automation devices 20 may include various types of equipment that may be used to perform the various operations that may be part of an industrial application. For instance, the industrial automation devices 20 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation devices 20 may also include motors, protection devices, switchgear, compressors, and the like.

In certain embodiments, one or more properties of the industrial automation devices 20 may be monitored and controlled by certain equipment for regulating control variables. For example, sensors 66 and actuators 68 may monitor various properties of the industrial automation devices 20 and may be involved to adjust operations of the industrial automation devices 20, respectively.

In some cases, the industrial automation devices 20 may be associated with devices used by other equipment. For instance, scanners, gauges, valves, flow meters, and the like may be disposed on industrial automation devices 20. Here, the industrial automation devices 20 may receive data from the associated devices and use the data to perform their respective operations more efficiently. For example, a controller (e.g., control/monitoring device 62) of a motor drive may receive data regarding a temperature of a connected motor and may adjust operations of the motor drive based on the data.

In certain embodiments, the industrial automation devices 20 and/or the control/monitoring device 62 may include a computing device and/or a communication component that enables the industrial devices 20 to communicate data between each other and other devices. The communication component may include a network interface that may enable the industrial automation devices 20 to communicate via various protocols such as EtherNet/IP®, ControlNet®, DeviceNet®, OPC United Architecture®, or any other industrial communication network protocol. Alternatively, the communication component may enable the industrial automation devices 20 to communicate via various wired or wireless communication protocols, such as Wi-Fi, mobile telecommunications technology (e.g., 2G, 3G, 4G, 5G, LTE), Bluetooth®, near-field communications technology, and the like.

The sensors 66 may be any number of devices adapted to provide information regarding process conditions. The actuators 68 may include any number of devices adapted to perform a mechanical action in response to a signal from a controller (e.g., the control and monitoring device 62). The sensors 66 and actuators 68 may be utilized to operate the industrial automation devices 20. Indeed, they may be utilized within process loops that are monitored and controlled by the control/monitoring device 62 and/or the HMI 60. Such a process loop may be activated based on process inputs (e.g., input from a sensor 66) or direct operator input received through the HMI 60. As illustrated, the sensors 66 and actuators 68 are in communication with the control/monitoring device 62. Further, the sensors 66 and actuators 68 may be assigned a particular address in the control/monitoring device 62 and receive power from the control/monitoring device 62 or attached modules.

Input/output (I/O) modules 70 may be added or removed from the local control system 42 via expansion slots, bays or other suitable mechanisms. In some embodiments, the control/monitoring device 62 may be situated at an end of a row of I/O modules 70 added to the local control system 42 via the expansion slots, bays, or other suitable mechanisms. In certain embodiments, the I/O modules 70 may be included to add functionality to the control/monitoring device 62, or to accommodate additional process features. For instance, the I/O modules 70 may communicate with new sensors 66 or actuators 68 added to monitor and control the industrial automation devices 20. Furthermore, the I/O modules 70 may communicate with the control/monitoring device 62 via various protocols such as EtherNet/IP®, ControlNet®, DeviceNet®, OPC United Architecture®, or any other industrial communication network protocol. It should be noted that the I/O modules 70 may communicate directly to sensors 66 or actuators 68 through hardwired connections or may communicate through wired or wireless sensor networks, such as Hart or IOLink.

Generally, the I/O modules 70 serve as an electrical interface to the control/monitoring device 62 and may be located proximate or remote from the control/monitoring device 62, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP®, and so forth), ControlNet®, DeviceNet®, OPC United Architecture®, or other network protocols (Foundation Fieldbus (H1 and Fast Ethernet) Modbus TCP. Profibus) and also communicate to higher level computing systems.

In the illustrated embodiment, several of the I/O modules 70 may transfer input and output signals between the control/monitoring device 62 and the industrial automation devices 20. As illustrated, the sensors 66 and actuators 68 may communicate with the control/monitoring device 62 via one or more of the I/O modules 70.

As discussed above, due to delays involved in processing data by the control/monitoring device 62 and the distance between a faulted component and the I/O module 70, improved communication schemes may be useful to expedite safety operations. For instance, in some embodiments, a direct path between industrial automation devices 20 may be established in the I/O modules 70 to reduce the delay. In some embodiments, the delays may include a communication transport delay from the I/O modules 70 to the control/monitoring device 62, a processing delay within the control/monitoring device 62, and the communication transport delay from the control/monitoring device 62 to the I/O modules 70. The communication transport delay from the I/O modules 70 to the control/monitoring device 62 may include the formulating of packets at the I/O modules 70, the unpacking of the packets at the control/monitoring device 62, and delays from network transmission from the hardwire connection. The communication transport delay from the control/monitoring device 62 to the I/O modules 70 may include the formulating of packets at the control/monitoring device 62, the unpacking of the packets at the I/O module 70, and delays from network transmission from the hardwire connection.

Figure 3:
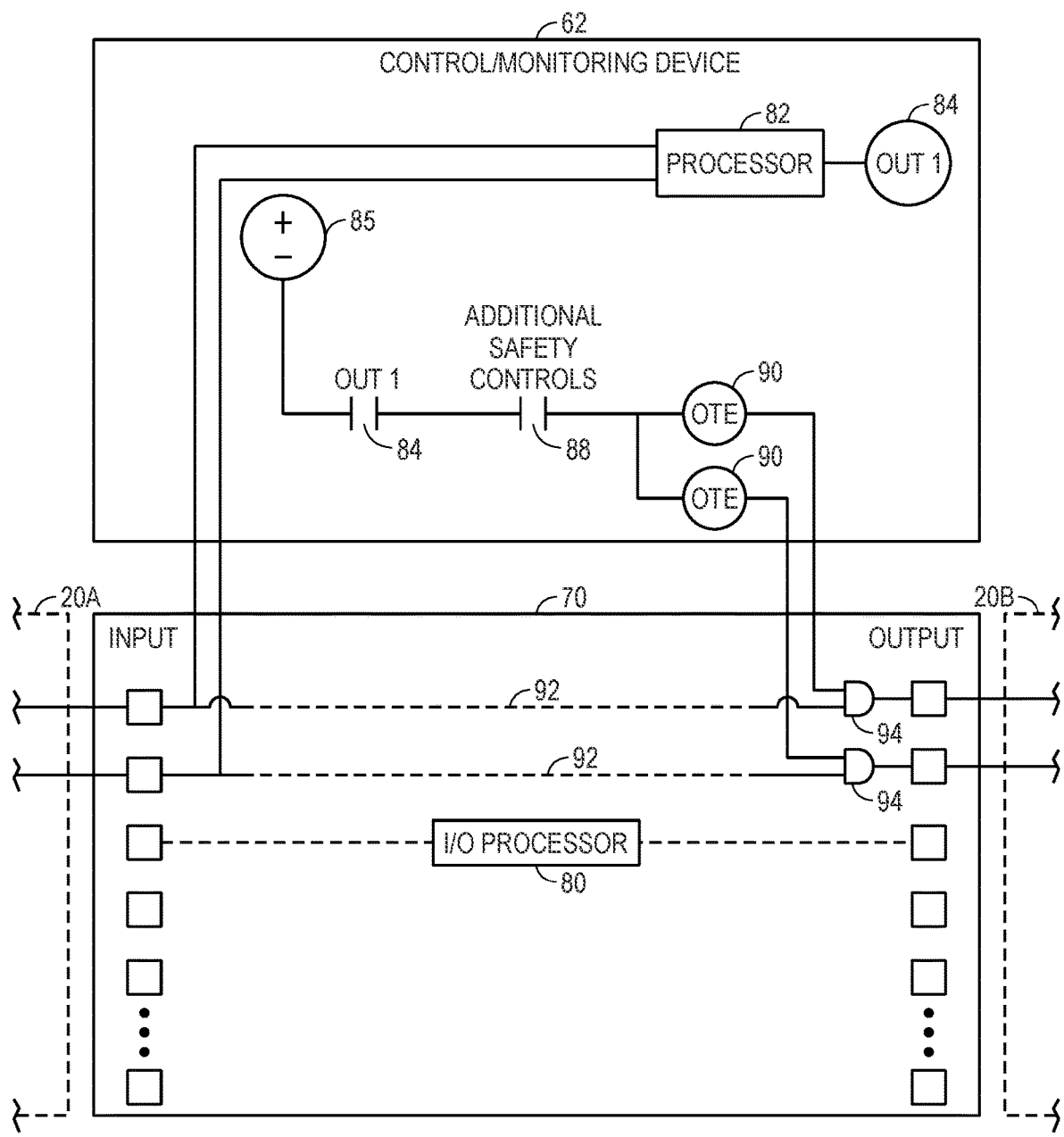
FIG. 3 illustrates an example of a safety loop circuit implemented in the local control system of FIG. 2, in accordance with embodiments presented herein.

With the foregoing in mind, FIG. 3 illustrates an example of a safety loop circuit that provides a direct path between input ports and output ports in the I/O module 70 in accordance with the present embodiments. Referring now to FIG. 3, a first device 20A (e.g., the industrial automation devices 20) may be communicatively coupled to an input of the I/O module 70. In some embodiments, the I/O module 70 may have one or more devices coupled as input devices. The one or more devices may include any suitable device connected to the local control system 42 in the industrial automation system 10. The I/O module 70 may include an I/O processor 82 to execute operations within the I/O module 70. As described in FIG. 2, the I/O module 70 may be communicatively coupled to the control/monitoring device 62 over a network or a hardwire connection. The control/monitoring device 62 may include a processor 82 (e.g., safety controller). The processor 82 may generate instructions based on incoming signals from the I/O module 70. Furthermore, the processor 82 may perform diagnostic operations based on incoming signals and create a data log representative of the incoming signals. The control/monitoring device 62 may include an output contactor 84, a power source 85, an additional safety contactor 88, and/or one or more Output Energize components (OTE) 90. The control/monitoring device 62 may receive signals from and transmit signals to the I/O module 70. The I/O module 70 may be communicatively coupled to a second device 20B, which receives signals from the I/O module 70, the control/monitoring device 62, or both. In some embodiments, the I/O module 70 may have one or more devices coupled as output devices.

The components discussed above may form a safety loop circuit, where the safety loop circuit may encompass a parallel path between the first device 20A and the second device 20B via the control/monitoring device 62 and the I/O module 70. By providing the parallel paths for signals received by the I/O module 70 from the first device 20A to be transmitted to the second device 20B, the second device 20B may receive the signals more quickly as compared to the signals being routed via the control/monitoring device 62. For example, the first device 20A may transmit a safety signal indicating that an error has occurred to the I/O module 70. The safety signal may indicate to connected devices to perform certain safety operations (e.g., shutdown, slowdown, redirection, etc.).

In some embodiments, the I/O module 70 may transmit the safety signal to the processor 82 of the control/monitoring device 62. The processor 82 may be asynchronous, so the safety signal may be received when a scan operation by the processor 82 is executed. The processor 82 may determine appropriate safety operations based on the safety signal and transmit a safety control signal to the output contactor 84. The output contactor 84 may be closed during regular operation. When the output contactor 84 receives the safety control signal, the output contactor 84 may transition to an open state and disrupt the logical high signal from the power source 85. In some embodiments, the output contactor 84 may be open during regular operation and transition to a closed state upon receiving the safety control signal. In addition to the output contactor 84, the additional safety contactor 88 may be closed during normal operation. The additional safety contactor 88 may transition between states based on alternative safety control signals. The alternative safety control signals may be unrelated to the safety signal from the first device 20A.

The OTE component 90 may receive a signal (or lack of signal) from the output contactor 84 and/or the additional safety contactor 88 The OTE component 90 may energize a single bit of data when the input is "true". That is, the OTE component 90 may output a logical high when the input is a logical high (i.e., "true") and a logical low when the input is a logical low (i.e., false). The OTE 90 may transmit a signal to the I/O module 70, where the I/O module 70 transmits the signal from the OTE 90 to the second device 20B. Upon receiving the signal from the I/O module 70, the second device 20B may initiate one or more safety operations based on the signal.

As explained above, to modify the operations of the second device 20B, the signal may traverse through multiple components before receiving instructions to the target downstream components (the second device 20B). In some cases, the time to reach the downstream devices may be between 80 milliseconds to 100 milliseconds. It should be noted that the time ranges mentioned are provided as examples and should not construed to limit the time ranges that apply to the present embodiments described herein. This latency may be too long for some safety operations to be safely executed. Conversely, a direct path with no intermediate components between the first device 20A and the second device 20B may decrease the safety distance considerably.

Keeping this in mind, a direct path 92 between the first device 20A and the second device 20B may be implemented in the I/O module 70. The direct path 92 may be implemented via firmware, software, and/or a physical path. The direct path 92 may be a wire, a trace, or any suitable physical connection. That is, for firmware or software implementations, the I/O processor 80 may receive signals from the first device 20A, process the signal, and forward the same signal or another signal to an output port of the I/O module 70 that may be connected to the second device 20B. As such, the direct path 92 as a physical connection may be a pre-implemented physical feature of the I/O module 70.

In some embodiments, the direct path 92 may pass signals from the first device 20A to a logic gate 94. It should be noted that although the currently illustrated logic gate 94 represents an AND gate, the logic gate 94 may be one or more different logic gates performing different logical operations. The logic gate 94 may perform one or more logical operations on the safety signal and another input signal from the control/monitoring device 62. By way of example, the logic gate 94 may perform an AND operation on the signal received from the first device 20A and the additional input signal received from the control/monitoring device 62. When either value is a logical low, the logic gate 94 may supply a logical low signal. The logical low safety signal received from the first device 20A may correspond to a fault condition (e.g., occurrence of a hazardous event) or a request for a safety operation to be performed. As such, the logical low safety signal directly coupled to the logic gate 94 may cause the logic gate 94 to immediately output a logical low signal to the second device 20B. The direct path 92 may have a safety distance of 1 microsecond to 0.5 milliseconds. It should be noted that the time ranges mentioned are provided as examples and should not construed to limit the time ranges that apply to the present embodiments described herein. The second device 20B may receive this logical low and initiate the safety operations. In some embodiments, the logic gate 94 may include other types of logic gates that perform other logical operations such as an OR gate, XOR gate, a NOR gate, a NAND gate, and/or any combination thereof. It should be noted that the logic gate 94 may be physical gates or simulated through software or firmware executed by the I/O module 70.

It should be noted that an addition of the direct path 92 in the I/O module 70 may continue to render the first safety loop through the control/monitoring device 62 operable. The control/monitoring device 62 may receive the signal from the first device 20A via the I/O module 70 and perform similar operations as described above with respect to the first safety loop. The second device 20B may have already undergone the one or more safety operations based on the signal received via the direct path 92 when the signal from the OTE 90 is received at the second device 20B via the I/O module 70. The signals from the first device 20A may be integral in the control/monitoring device 62 operating processes in monitoring the industrial automation system 10. In some embodiments, there may exist multiple direct path 92 in the I/O module 70 between one or more devices 20.

As discussed above, the direct path 92 may also be implemented via firmware and/or software. Modifying the software may include modifying an Add-On-Profile (AOP). The AOP may be a set of configurable instructions for configuring one or more devices 20, I/O modules 70, and/or other industrial automation equipment and specifying the connections of the one or more devices 20, I/O modules 70, and/or other industrial automation equipment to the control/monitoring device 62 and the local control system 42. That is, each component of the industrial automation system 10 may be associated with a respective AOP. In this way, the AOP may cause the I/O processor—to implement the logic operations of the logic gate 94 for the input signals received by the I/O module 70. Furthermore, each AOP may be associated with an electronic data sheet (EDS), which includes information related to the associated component (e.g., vendor name, product name, revision number, etc.). In some embodiments, modifying the AOP of the I/O module 70 may allow the signal from the first device 20A to be transmitted via the direct path 92 to two or more devices 20 by way of modifying field programmable gate arrays or other hardware components.

Figure 4:
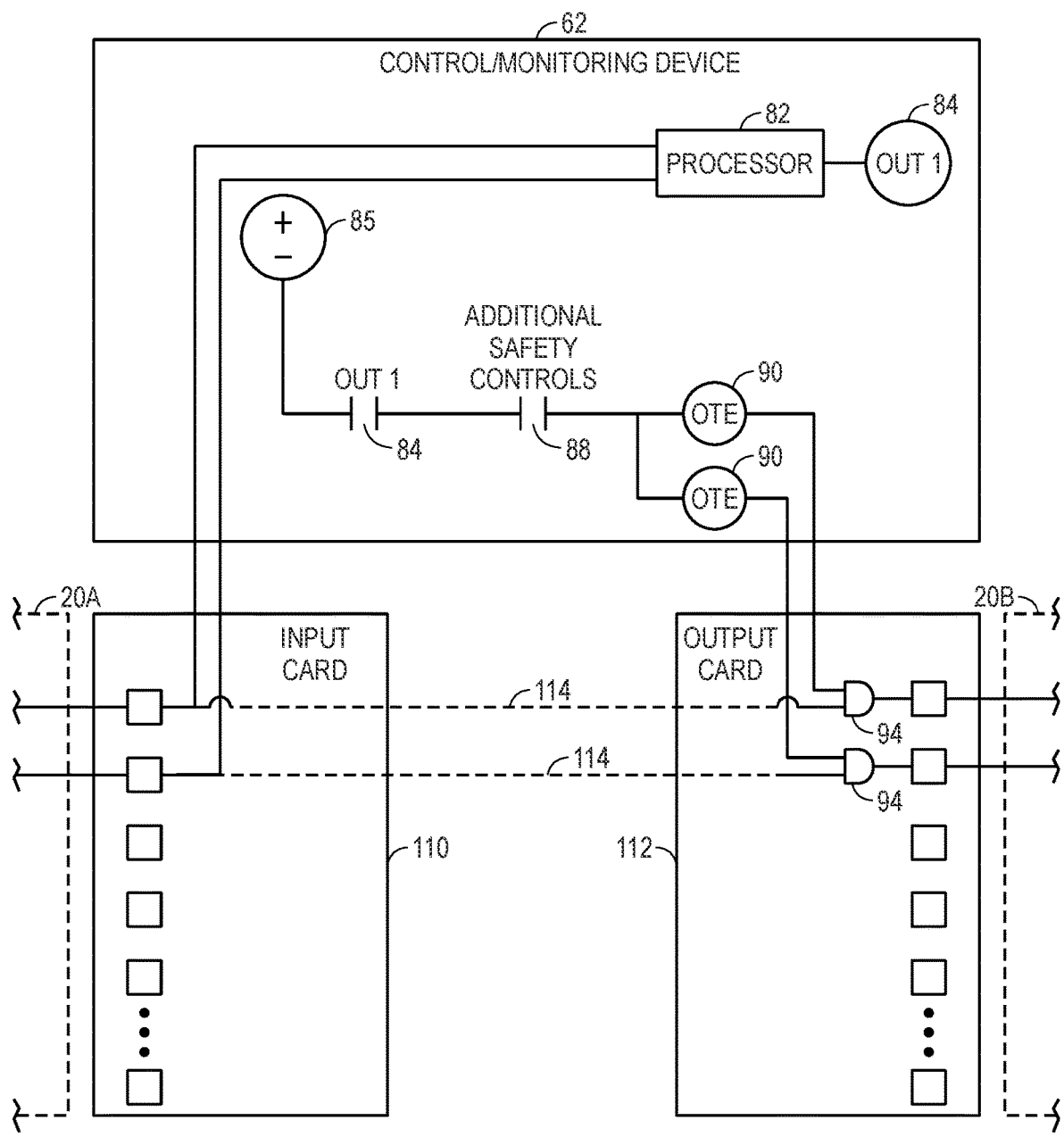
FIG. 4 illustrates an example of a safety loop circuit implemented via peer-to-peer messaging in the local control system of FIG. 2, in accordance with embodiments presented herein.

In some embodiments, the safety signal may be communicated via one or more input and output modules (e.g., cards) through peer-to-peer messaging. That is, the reduced safety distance may be implemented between two modules that are not physically located within the same module (i.e., an I/O module 70). With the foregoing in mind, FIG. 4 illustrates an example of a safety loop circuit implemented via peer-to-peer messaging, in accordance with current embodiments. Referring to FIG. 4, an input card 110 may be communicatively coupled to the first device 20A. The input card 110 may be a module configured to receive inputs from one or more devices 20 and transmit the signals from the one or more devices via network communication and/or a backplane connection. The input card 110 may be communicatively coupled to the control/monitoring device 62 via a hardline connection and/or a network connection and transmit a safety signal from the first device 20A to the control/monitoring device 62. The control/monitoring device 62 may perform operations similar to the operations of the control/monitoring device 62 of FIG. 3.

The control/monitoring device 62 may be coupled to an output card 112 via a hardline connection and/or a network connection. The output card 112 may be a module configured to receive input signals via network communication and/or a backplane connection (from one or more devices 20, the control/monitoring device 62, and/or one or more input cards 110) and transmit the signals to the one or more devices 20 (e.g., the second device 20B). The input card 110 and the output card 112 may be communicatively coupled via a backplane connection and/or a network connection. This connection may allow for peer-to-peer messaging between the input card 110 and the output card 112, where signals between each module are able to be received without communicating through a control module (e.g., the control/monitoring device 62).

Similar to FIG. 3, the first device 20A may be communicatively coupled to the input card 110 and may transmit a safety signal to the input card 110. The input card 110 may directly transmit the safety signal to the output card 112 via a direct path 114. The output card 112 may pass the signal received via the direct path 114 through one or more logic gates 94. The one or more logic gates 94 may perform logic operations (e.g., AND, OR, NAND, NOR, or any combination thereof) on the signal from received from the output card 112 and transmit the resulting output to the second device 20B.

The safety distance of the direct path 114 may be a slightly greater than the safety distance of the direct path 92 with a safety distance between 10 milliseconds to 50 milliseconds. It should be noted that the time ranges mentioned are provided as examples and should not construed to limit the time ranges that apply to the present embodiments described herein. However, an advantage of peer-to-peer messaging between the input card 110 and the output card 112 is that the direct path 114 may be implemented between two modules located in different physical locations of the industrial automation system 10. Similar to the I/O module 70 of FIG. 3, the input card 110 and the output card 112 may be configured via each respective AOP to implement the direct path 114.

By employing the techniques described in the present disclosure, the systems described herein may implement a direct path 92 in the I/O module 70 to bypass the control/monitoring device 62 and provide direct communication between the first device 20A and the second device 20B communicatively coupled to the I/O module 70. In some embodiments, the direct path 114 may be implemented between the input card 110 and the output card 112 in the industrial automation system 10. In some cases, the direct path 92 or 114 may transmit a safety signal to one or more logic gates in the I/O module 70 or the output card 112 to perform logical operations on safety signals. The I/O module 70 or the output card 112 may transmit input signals from the first device 20A directly as output signals to the second device 20B.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

While only certain features of the present disclosure have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. A circuit, comprising:
a plurality of first ports configured to receive a plurality of input signals from one or more first devices, wherein the plurality of first ports is configured to couple to a control system configured to generate a plurality of output signals based on the plurality of input signals; and
a plurality of second ports configured to send the plurality of output signals to one or more second devices;
a plurality of logic gates configured to couple to the control system and receive the plurality of output signals from the control system, wherein each logic gate of the plurality of logic gates is further configured to couple a respective one of the plurality of first ports via a direct connection to a corresponding one of the plurality of second ports, wherein a first logic gate of the plurality of logic gates is configured to:
receive a safety signal from the respective one of the plurality of first ports; and
receive a first output signal of the plurality of output signals from the control system, wherein the safety signal from the respective one of the plurality of first ports is received prior to the first output signal is received from the control system.

2. The circuit of claim 1, wherein each logic gate of the plurality of logic gates coupled to the respective one of the plurality of first ports and the corresponding one of the plurality of second ports is configured to perform one or more logical operations based on a corresponding one of the plurality of input signals and a corresponding one of the plurality of output signals.

3. The circuit of claim 1, wherein the plurality of logic gates comprises one or more AND gates, one or more OR gates, one or more XOR gates, one or more NOR gates, one or more NAND gates, or any combination thereof.

4. The circuit of claim 1, wherein the plurality of logic gates corresponds to physical gates, simulated gates in software or firmware, a representation of the logic gates implemented in a field-programmable gate array (FPGA), or any combination thereof.

5. The circuit of claim 1, wherein each of the plurality of second ports is configured to receive the plurality of input signals via a respective logic gate of the plurality of logic gates before receiving a corresponding one of the plurality of output signals.

6. The circuit of claim 1, wherein the control system is configured to control one or more states of one or more contactors, one or more output energize components, or any combination thereof based on one or more input signals of the plurality of input signals.

7. The circuit of claim 1, comprising a processor configured to receive the plurality of input signals and transmit a plurality of second output signals to the plurality of logic gates via respective direct connections.

8. A method, comprising:
receiving, via a circuit, a plurality of input signals at a plurality of first ports, wherein the plurality of first ports is configured to couple to a control system configured to generate a plurality of output signals based on the plurality of input signals;
directly routing, via the circuit, the plurality of input signals to a plurality of logic gates configured to couple to a plurality of second ports; and
simultaneously routing, via the circuit, the plurality of input signals to the control system while directly routing the plurality of input signals to the plurality of logic gates, wherein a first logic gate of the plurality of logic gates is configured to:
receive a safety signal from a respective one of the plurality of first ports; and
receive a first output signal of the plurality of output signals from the control system, wherein the safety signal from the respective one of the plurality of first ports is received prior to the first output signal is received from the control system.

9. The method of claim 8, wherein directly routing the plurality of input signals to the plurality of logic gates configured to couple to the plurality of second ports comprises routing the plurality of input signals via a wire, a trace, a conductor, or any combination thereof disposed in the circuit.

10. The method of claim 8, wherein the plurality of input signals is received at the plurality of logic gates corresponding to the plurality of second ports before receiving the plurality of output signals from the control system.

11. The method of claim 8, wherein the plurality of input signals comprises at least one safety signal received at the plurality of first ports from a device, wherein the at least one safety signal is generated by the device based on a detection of one or more hazardous events.

12. The method of claim 8, comprising performing, via the plurality of logic gates of the circuit, one or more logical operations based on the plurality of input signals and the plurality of output signals.

13. A system, comprising:
a device configured to generate a plurality of output signals based on a plurality of input signals; and
an Input/Output (I/O) module configured to couple to the device, wherein the I/O module comprises circuitry, wherein the circuitry comprises:
a plurality of first ports configured to couple to the device, wherein the plurality first ports is configured to receive the plurality of input signals;
a plurality of second ports configured to send the plurality of output signals to one or more second devices; and
a plurality of logic gates configured to couple to the device and receive the plurality of output signals from the device, wherein each logic gate of the plurality of logic gates is further configured to couple a respective one of the plurality of first ports via a direct connection to a corresponding one of the plurality of second ports, wherein a first logic gate of the plurality of logic gates is configured to:
receive a safety signal from the respective one of the plurality of first ports; and
receive a first output signal of the plurality of output signals from the device, wherein the safety signal is received from the respective one of the plurality of first ports prior to the first output signal is received from the device.

14. The system of claim 13, wherein each of the plurality of second ports is configured to receive the plurality of input signals via the direct connection before receiving the plurality of output signals.

15. The system of claim 13, wherein the I/O module comprises a processor configured to implement one or more logic operations based on the plurality of input signals.

16. The system of claim 15, wherein the processor is configured to modify one or more field programmable gate arrays based on the one or more logic operations.

17. The system of claim 15, wherein the processor is configured to receive a set of configurable instructions for configuring the device, the I/O module, the one or more logic operations, or any combination thereof.

18. The system of claim 13, wherein the I/O module comprises an input card and an output card, wherein the input card is configured to communicate the plurality of input signals through peer-to-peer messaging to the output card.

19. The system of claim 18, wherein the input card is configured to couple to the output card via a backplane connection, a network connection, or both.

20. The system of claim 13, wherein the plurality of input signals comprises at least one safety signal, wherein the at least one safety signal is indicative of one or more hazardous events.

* * * * *